Patented Oct. 26, 1937

2,097,269

UNITED STATES PATENT OFFICE

2,097,269

PIGMENT AND PROCESS OF PREPARING SAME

Philip D. Brossman, Kearny, N. J., assignor, by mesne assignments, to E. I. du Pont de Nemours & Company, Wilmington, Del., a corporation of Delaware No Drawing. Application April 6, 1934, Serial No. 719,297

19 Claims. (Cl. 134—67)

This invention relates to pigments and the preparation of same and, more particularly, to a new form of basic lead carbonate pigment and to a process of preparing same.

Heretofore methods have been known whereby basic lead carbonate has been prepared by precipitation by means of gaseous carbon dioxide from lead-containing solutions. Thenard, for example, discloses a method whereby a variety of basic lead carbonate is prepared by passing carbon dioxide into a basic lead acetate solution but the product so obtained was crystalline and lacked sufficient covering power for use as a pigment and therefore was subsequently ground to increase this covering power. Even so, the covering power was so inferior that the process was discarded. Examination of the records relating to Thenard's process indicates that the precipitation took place in a highly concentrated lead acetate solution.

An object of the present invention is to provide a highly useful form of basic lead carbonate pigment differing radically from Thenard's variety or any other variety of white lead heretofore known. A further object is to produce a pigment having entirely different properties as to reflectivity and luster from ordinary white lead. A still further object is to provide a pigment that can be used satisfactorily as a substitute for pearl essence which is also known as essence D'Orient and fish scale essence. A further object is to provide a simple and economical process of preparing such pigment. Other objects of the invention will be apparent from the description given hereinafter.

The above objects are accomplished according to the present invention by treating a dilute aqueous solution of basic lead acetate with gaseous carbon dioxide to precipitate a basic lead carbonate and, to put same in form for commercial use, washing said precipitate and dehydrating same. More particularly, the invention comprises passing carbon dioxide gas into an aqueous solution of basic lead acetate containing 0.5–6.0% by weight of lead, preferably the lead content is between 1.6–2.8%, the temperature of said solution being from 0–100° C., until the solution is slightly acid, washing the precipitate formed free of dissolved lead, and dehydrating the precipitate by means of an organic liquid. The product so obtained comprises minute, lustrous, hexagonal plates of basic lead carbonate.

As known in the industry, basic lead acetate solution is prepared by dissolving neutral lead acetate in water and in this solution dissolving lead oxide, PbO, until no more will dissolve. This gives a concentrated solution of basic lead acetate containing 11–12% of lead by weight. Upon diluting this solution by the addition of water to give the desired concentration and adjusting the temperature, all in accordance with the present invention, the introduction of carbon dioxide gas causes the basic portion of the dissolved lead to precipitate as lustrous, hexagonal, crystalline plates while the neutral lead acetate remains unused in the solution as shown by the following equation:—

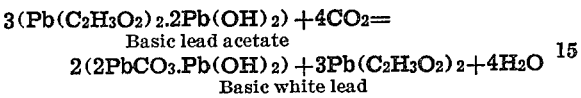
$$3(Pb(C_2H_3O_2)_2.2Pb(OH)_2) + 4CO_2 =$$
Basic lead acetate
$$2(2PbCO_3.Pb(OH)_2) + 3Pb(C_2H_3O_2)_2 + 4H_2O$$
Basic white lead In economically carrying out the process the solution of basic lead acetate is treated with carbon dioxide gas until it becomes slightly acid to litmus, as in this way the basic portion of the dissolved lead is more or less completely precipitated, whereas if the carbon dioxide treatment were stopped at a point prior to this there would be some inefficiency inasmuch as some of the basic portion of the dissolved lead would not be used.

In order to obtain the variety of pigment herein disclosed, the concentration of the basic lead acetate solution and the temperature at which the reaction is carried out are important factors. A stock solution of basic lead acetate, that is, one prepared as described above and containing 11–12% lead by weight, furnishes a convenient source of basic lead acetate which may be diluted with water to the desired concentration for use in the present invention. In preparing the basic lead acetate solution care should be exercised to see that the basic lead acetate used should conform as closely as possible to the formula: $Pb(C_2H_3O_2)_2.2Pb(OH)_2$; less basic raw material, though usable, gives a much lower yield of product.

The lustrousness of the final product obtained according to the present invention may be increased by adding a solution of zinc acetate or other suitable salt to the basic lead acetate solution during the precipitating operation. Also the metallic appearance of the pigment may be enhanced by adding a colorless organic substance, such as a dyestuff intermediate. Furthermore, to obtain a colored lustrous pigment a solution of a dye may be added to the basic lead acetate solution, either before or during the precipitation of the basic lead carbonate by carbon dioxide gas.

Broadly a basic lead acetate solution containing from 0.5–6.0% by weight may be employed in the present process, although when not using an auxiliary agent such as the zinc acetate or a dyestuff intermediate, it is difficult to get a pigment having any appreciable luster unless a solution is employed having from 1.4–4.0% lead. In practical operation where no auxiliary agent is used, it probably will be preferred to employ a solution having 1.6–2.8% lead as within this range a product of exceptional luster is assured. It has been found that the optimum solution contains 2.0–2.6% lead and within that range a solution containing 2.2% has been found most suitable. As those skilled in this art will understand, variations in the concentration of the basic lead acetate solution will be made to meet certain practical considerations but, in general, the proportions set forth above must be employed for best results.

The temperature of the solution can be varied widely from 0–100° C., although as a practical matter operation outside the range of 5–85° C. would be unusual. It is preferred to have the solution within the temperature range of 20–30° C., preferably about 25° C. Nevertheless by working the solution at a temperature of 75–85° C., preferably 80° C., a very superior pigment may be prepared although its reflectivity is not quite as good as pigments prepared with solutions in the temperature range of 20–30° C.

In order to illustrate the present invention the following specific examples are given:—

*Example 1.*—A stock solution of basic lead acetate containing 11–12% of lead was diluted with four times its volume of water giving a solution with a concentration of approximately 2.6% lead by weight. This solution was brought to a temperature of 25° C. and a current of carbon dioxide was passed in while the solution was agitated by a stirrer. The end of the reaction, when substantially all of the basic portion of the soluble lead had been used up, was indicated by frothing, by the appearance of an acid reaction with litmus paper, and by an odor of free acetic acid. At this point the flow of carbon dioxide was stopped and the reaction mixture diluted to approximately four times its volume with water and washed by decantation until no further test for dissolved lead was obtained. The pigment was then filtered and dehydrated with alcohol preparatory to its further use. The product obtained was a pigment comprising white, lustrous, tiny hexagonal crystalline plates.

This product, as those obtained in the following examples, was in a form suitable to be incorporated in plastic compositions, paints, or other vehicles in which pigments are customarily employed.

*Example 2.*—A stock solution of basic lead acetate containing 11–12% of lead was diluted with five times its volume of water, thus giving a solution with a concentration of approximately 2.2% of lead, and brought to a temperature of 25° C. A current of carbon dioxide was passed into the solution while the latter was being agitated by a stirrer; at the same time a dilute solution of zinc acetate containing 1 mol. of zinc acetate for every 50 mols of basic lead acetate in the lead liquor, was added at such a rate that all of the zinc acetate solution was added shortly before the basic portion of the lead acetate was completely precipitated by the carbon dioxide. The end of the reaction was indicated as in Example 1 and at this point the flow of carbon dioxide was stopped and the reaction mixture diluted to approximately four times its volume with water and washed by decantation until no further test for dissolved lead was obtained. The pigment was then filtered and dehydrated with alcohol preparatory to its further use. The pigment comprised white, highly lustrous, tiny hexagonal crystalline plates.

This example illustrates the invention wherein the luster of the pigment is enhanced by the introduction of zinc acetate solution during precipitation of the pigment.

*Example 3.*—A stock solution of basic lead acetate containing approximately 11–12% lead was diluted with four times its volume of water, thus giving a concentration of approximately 2.6% of lead. The solution was brought to a temperature of 80° C. and a current of carbon dioxide was passed into the liquid, which was agitated by stirring, until the liquid became acid to litmus. The pigment was then washed free of dissolved lead and treated further as in Example 1. A product was obtained similar to that in Example 1 although somewhat less lustrous.

*Example 4.*—A stock solution of basic lead acetate containing 11–12% lead was diluted with four times its volume of water, thus giving a solution with a concentration of approximately 2.6% of lead. This solution was brought to a temperature of 25° C. A current of carbon dioxide was now passed into the solution which was agitated by stirring and at the same time a solution of zinc acetate containing 1 mol. of zinc acetate for every 50 mols of basic lead acetate was added at such a rate that all of the zinc acetate was added shortly before the basic portion of the lead acetate was completely precipitated by the carbon dioxide. The current of carbon dioxide was cut off when the solution turned acid to litmus and procedure from this point was the same as in Example 1. The pigment obtained was slightly more lustrous but otherwise the same as that produced in Example 1.

This example, like Example 2, illustrates the use of zinc acetate for enhancing the luster of the pigment.

*Example 5.*—A lead acetate solution was brought to the same concentration and temperature as in Example 2. A zinc acetate solution was prepared and added also as in Example 2. A water solution of the dyestuff tartrazine 0 in the same amount and dilution as the zinc acetate solution, was added at the same time and the same rate as the zinc acetate solution. There was no significance in the matching of these two solutions; it merely happened that a satisfactory shade was produced when using the dyestuff in the above proportions. At the end of the precipitation and washing the pigment was found to have taken up the dyestuff in a form quite resistant to alcohol and the pigment had the appearance of shiny, yellow plates or flakes.

This example illustrates not only the addition of zinc acetate solution but also the addition of a dyestuff during precipitation of the basic lead acetate in order to obtain a colored pigment. In this instance the dyestuff is added during the precipitation because it would form a precipitate with the lead liquor if introduced prior to precipitation and the result obtained would not be satisfactory.

*Example 6.*—A stock solution of basic lead acetate containing 11–12% lead was diluted with five times its volume of a dilute solution of eosin containing 1 mol. of eosin for every 50 mols of basic lead acetate in the liquor. The addition of carbon dioxide and zinc acetate was carried out as in Example 2. The reaction was discontinued and the precipitate washed as in the preceding examples. The pigment obtained was composed of shiny, orange red hexagonal plates. The pigment was fairly stable to alcohol but not quite as stable as the product of Example 5.

This example illustrates the addition of a dyestuff to the basic lead acetate solution prior to introducing the carbon dioxide, the eosin solution not forming a precipitate with the lead liquor.

*Example 7.*—A pigment was prepared in exactly the same manner as set forth in Example 6 except that beta-oxynaphthoic acid replaced the eosin. The product was grayish white and had a high metallic luster. It resembled very closely aluminum bronze.

In all of the above examples the moist material may be dehydrated by drying in air or by means of alcohol, acetone, or other organic liquid which will not affect the pigments and which is compatible with the vehicle in which the pigment will be used. Also the pigment may be preserved as a paste. It is to be understood that the above examples are given merely to illustrate the invention which broadly comprises the process of treating a dilute basic lead acetate solution with carbon dioxide to precipitate a basic lead carbonate in the form of minute, lustrous, hexagonal crystalline plates. As heretofore indicated, the temperature of the basic lead acetate solution and likewise the temperature of any solutions being added in order to enhance the luster of the pigment, or give it a metallic appearance, or produce some desired color, may be varied widely. The same considerations apply to the temperature of the added solutions as apply to the temperature of the basic lead acetate solution, and best results are obtained if the temperature of solutions being added is approximately the same as the basic lead acetate solution.

The exact manner in which the luster of the pigment is enhanced by the addition of zinc acetate has not been definitely determined, although it is apparent that the zinc is precipitated with the basic lead carbonate and it is probable that the zinc is in the form of carbonate or basic carbonate. It has been found that the best results are obtained by adding the zinc acetate solution at a concentration of 0.25–2.0% by weight of zinc and at a rate such that the addition is practically co-extensive with the introduction of the carbon dioxide. It is preferred that where this auxiliary agent to enhance the luster of the pigment is employed the total amount should be approximately 2 mols of zinc acetate to 100 mols of basic lead acetate, a practical range being very slightly less than 2 to 3.0 mols of zinc acetate to 100 mols of basic lead acetate and that, as a practical matter, the range of 1.0–6.0 mols of zinc acetate to 100 mols of basic lead acetate should not be exceeded.

It has been found that in place of zinc acetate other zinc salts may be employed which do not give a precipitate with the lead liquor, as for example, nitrate, formate, propionate, bromate, chlorate perchlorate persulfate sulfocyanate, and also derivatives of other organic acids whose lead salts are soluble. It is preferred to use either the acetate or the nitrate.

In place of zinc other metals such as calcium, lithium, and magnesium can be employed and are almost as advantageous as zinc. Furthermore, metals such as barium, strontium, thorium, and cadmium can likewise be employed although these salts are not so satisfactory in enhancing the lustrous property of the pigment. However, salts of these metals may be used and in some cases their characteristic properties are of value. For example, barium and calcium may be used to advantage for obtaining variations in the products when a sulfonic acid dye derivative is employed in the preparation of the pigment. Where using any of these various salts the same considerations as to concentration of solution and total amount of solution added apply that have been indicated above with respect to the addition of zinc acetate solutions.

Either alone or in addition to the zinc acetate solution, or equivalent solutions, there may be added, during the precipitation of the basic lead carbonate pigment by means of carbon dioxide, colorless organic compounds such as dyestuff intermediates which enhance the luster of the resulting pigment. It is particularly advantageous to add dyestuff intermediates such as those containing carboxyl, hydroxyl, or sulphonic acid groups in connection with the zinc acetate solution or equivalent. A further intensification of the luster is thus obtained, so much so in the case of betahydroxynaphthoic acid as to cause the resulting pigment to resemble flake metallic pigments. Anthranilic acid and paranitrobenzoic acid may be mentioned as particularly effective intermediates for use in the present invention. The pigments obtained in this manner have an appreciably purer white color than in the case of most metallic pigments. Metallic pastel shades may be obtained by the use of dyes in addition to the intermediates.

As in the case of the zinc acetate solution, the amount of dyestuff intermediate necessary to obtain the maximum increase in luster is very small. A proportion of about 0.5–2.0 mols of intermediate dissolved in water per 100 mols of basic lead acetate is suitable for practical purposes. Where the intermediate would form a precipitate with the basic lead acetate solution, it is added during the precipitation of the pigment in the same manner as the zinc acetate solution is added. The solution of intermediate is preferably very dilute, i. e., about 0.1–0.5% intermediate.

Dyestuffs and coloring matter may be added to the basic lead acetate solution prior to precipitation of the pigment if they are soluble in the acetate liquor. For example, the fluorescein dyestuffs such as eosin, erythrosin, and Rose Bengale, are mixed with a small amount of water and added to the acetate liquor prior to introduction of the carbon dioxide. On the other hand, with coloring matter that would precipitate in the acetate liquor, a dilute aqueous solution, preferably containing about 0.1–0.5% of the dye, is added during precipitation in the same manner as the zinc acetate solution. The total quantity of coloring matter is, of course, dependent on the shade of color desired.

The carbon dioxide used may be either commercially pure or diluted with air or other inert gas which will not react with the basic lead acetate solution. Suitably filtered flue gas may be used.

The precipitate of basic lead carbonate pigment may be separated from the supernatant liquid, not only by decantation as set forth in the specific examples, but by any of the other known methods such as sedimentation, filtration, and the like. The precipitate should then be washed with water until the washing shows no test for dissolved lead, as tested by the commonly accepted methods of qualitative analysis, in order to obtain the best results. The water remaining in the washed and still wet precipitate is then replaced by any of the known methods, such as using denatured alcohol, although acetone or any other organic liquid could be employed which does not affect the pigment and which might be desired as being more compatible with the final vehicle in which the pigment is to be used. Also the pigment may be dehydrated by drying in air. It may be kept prior to use as a suspension in a liquid or as a paste, as will occur to those skilled in this art.

An advantage of the present invention is that it provides a process of economically producing a pigment suitable for use as a substitute for the expensive pearl essence. Furthermore, according to the present invention pigments having the appearance of metal flakes but much whiter in color can be prepared. The process is extremely flexible in permitting pigments of all shades and degrees of luster to be made. The present pigments are suitable for use in paints, lacquers, films, plastic slabs, and the like, being particularly valuable where the optical properties of the pigment as heretofore disclosed are of special advantage. These pigments are readily distinguished from the ordinary white lead by their reflectivity and luster.

As many apparently widely different embodiments of this invention may be made without departing from the spirit and scope thereof, it is to be understood that the invention is not limited to the specific embodiments thereof except as defined in the appended claims.

I claim:

1. Process of preparing a basic lead carbonate pigment which comprises treating an aqueous solution of basic lead acetate containing from 2.0 to 2.6% lead with carbon dioxide to precipitate a basic lead carbonate and recovering said precipitate.

2. Process of preparing a basic lead carbonate pigment which comprises treating an aqueous solution of basic lead acetate containing from 1.4 to 4.0% lead with carbon dioxide gas to precipitate a basic lead carbonate and recovering said precipitate.

3. Process of preparing a basic lead carbonate pigment which comprises passing carbon dioxide gas into an aqueous solution of basic lead acetate containing from 1.6 to 2.8% lead, the temperature of said solution being between 0°–100° C., until the solution is at least neutral, and recovering the precipitate thus formed.

4. Process of preparing a basic lead carbonate pigment which comprises passing carbon dioxide gas into an aqueous solution of basic lead acetate containing from 2.0 to 2.6% lead, the temperature of said solution being between 5°–85° C., until the solution is slightly acid, and recovering the precipitate thus formed.

5. Process of preparing a basic lead carbonate pigment which comprises passing carbon dioxide gas into an aqueous solution of basic lead acetate containing from 2.0 to 2.6% lead, the temperature of said solution being between 20°–30° C., until the solution is slightly acid, washing the precipitate thus formed with water until free of dissolved lead, and dehydrating the precipitate.

6. Process of preparing a pigment which comprises passing carbon dioxide gas into an aqueous solution of basic lead acetate containing 0.5 to 6.0% lead until the solution is at least neutral while substantially coextensively therewith slowly introducing into the solution a dilute aqueous solution of a salt in a total amount equal to 1–6 mols of the salt to 100 mols of the basic lead acetate, the metal radical of the salt being selected from the group consisting of zinc, calcium, lithium, magnesium, barium, cadmium, strontium and thorium, and the acid radical being one that will not form an insoluble compound with lead, and recovering the precipitate thus formed.

7. Process of preparing a pigment which comprises passing carbon dioxide gas into an aqueous solution of basic lead acetate containing 1.6 to 2.8% lead, the temperature of said solution being between 5°–85° C., until the solution is slightly acid while substantially co-extensively therewith slowly introducing into the solution a dilute aqueous solution of a salt from the group consisting of the acetates and nitrates of zinc, calcium, lithium, and magnesium, in a total amount equal to 1 to 6 mols of the salt to 100 mols of the basic lead acetate, the temperature of said solution being approximately the same as the temperature of the basic lead acetate solution, and recovering the precipitate thus formed.

8. Process of preparing a pigment which comprises passing carbon dioxide gas into an aqueous solution of basic lead acetate containing 0.5–6.0% lead until the solution is at least neutral while substantially coextensively therewith slowly introducing into the solution a dilute aqueous solution of zinc acetate in a total amount equal to 1–6 mols of zinc acetate to 100 mols of basic lead acetate, and recovering the precipitate thus formed.

9. Process of preparing a pigment which comprises passing carbon dioxide gas into an aqueous solution of basic lead acetate containing 1.6–2.8% lead, the temperature of said solution being between 5°–85° C., until the solution is slightly acid, while substantially coextensively therewith slowly introducing into the solution a dilute aqueous solution of zinc acetate in a total amount equal to 2–3 mols of zinc acetate to 100 mols of the basic lead acetate, the temperature of said solution being approximately the same as the temperature of the basic lead acetate solution, and recovering the precipitate thus formed.

10. Process of preparing a basic lead carbonate pigment which comprises passing carbon dioxide gas into an aqueous solution of basic lead acetate containing 0.5–6.0% lead until the solution is at least neutral while substantially coextensively therewith slowly introducing into the solution a dilute aqueous solution of a dyestuff intermediate in a total amount equal to 0.5–2.0 mols of the intermediate to 100 mols of the basic lead acetate, and recovering the precipitate thus formed.

11. Process of preparing a basic lead carbonate pigment which comprises passing carbon dioxide gas into an aqueous solution of basic lead acetate containing 1.6–2.8% lead, the temperature of said solution being between 5°–85° C., until the solution is slightly acid while substantially coextensively therewith slowly introducing into the solution a dilute aqueous solution of a dyestuff intermediate from the group consisting of betahydroxynaphthoic acid, anthranilic acid, and paranitrobenzoic acid, in a total amount equal to 0.5–2.0 mols of the intermediate to 100 mols of the basic lead acetate, the temperature of said solution being approximately the same as the temperature of the basic lead acetate solution, and recovering the precipitate thus formed.

12. Process of preparing a basic lead carbonate pigment which comprises passing carbon dioxide gas into an aqueous solution of basic lead acetate containing 1.4-4.0% lead until the solution is at least neutral while substantially coextensively therewith slowly introducing into the solution an aqueous solution of a dyestuff, and recovering the precipitate thus formed.

13. Process of preparing a basic lead carbonate pigment which comprises passing carbon dioxide gas into an aqueous solution of basic lead acetate containing 1.6-2.8% lead, the temperature of said solution being between 5°-85° C., until the solution is slightly acid while substantially coextensively therewith slowly introducing into the solution an aqueous solution of a dye, the temperature of said solution being approximately the same as the temperature of the basic lead acetate solution, and recovering the precipitate thus formed.

14. Process of preparing a basic lead carbonate pigment which comprises passing carbon dioxide gas into an aqueous solution of basic lead acetate containing 1.4-4.0% lead and said solution having dissolved therein a dyestuff which will not form an insoluble compound with lead, until the solution is at least neutral, and recovering the precipitate thus formed.

15. Process of preparing a basic lead carbonate pigment which comprises passing carbon dioxide gas into an aqueous solution of basic lead acetate containing 1.6-2.8% lead and said solution having dissolved therein a dyestuff which will not form an insoluble compound with lead, the temperature of said solution being between 5°-85° C., until the solution is slightly acid, and recovering the precipitate thus formed.

16. Pigment comprising basic lead carbonate in the form of minute lustrous hexagonal crystalline plates and a small quantity of a water insoluble zinc compound precipitated therewith by passing carbon dioxide gas into an aqueous solution of basic lead acetate containing 0.5-6.0% lead until the solution is at least neutral while substantially coextensively therewith slowly introducing into the solution a dilute aqueous solution of zinc acetate in a total amount equal to 1-6 mols of zinc acetate to 100 mols of basic lead acetate.

17. A lustrous pigment comprising basic lead carbonate in the form of minute hexagonal crystalline plates, said pigment being the precipitate obtained by treating an aqueous solution of basic lead acetate containing from 0.5 to 6.0% lead with carbon dioxide.

18. A pearl essence-like pigment comprising basic lead carbonate, said pigment being the precipitate obtained by treating an aqueous solution of basic lead acetate, containing from 1.4 to 4.0% lead, with carbon dioxide.

19. A pearl essence-like pigment comprising basic lead carbonate in the form of lustrous minute hexagonal crystalline plates.

PHILIP D. BROSSMAN.